April 8, 1941.   L. J. DAVIES   2,237,754
ELECTRIC LAMP
Filed Oct. 18, 1939
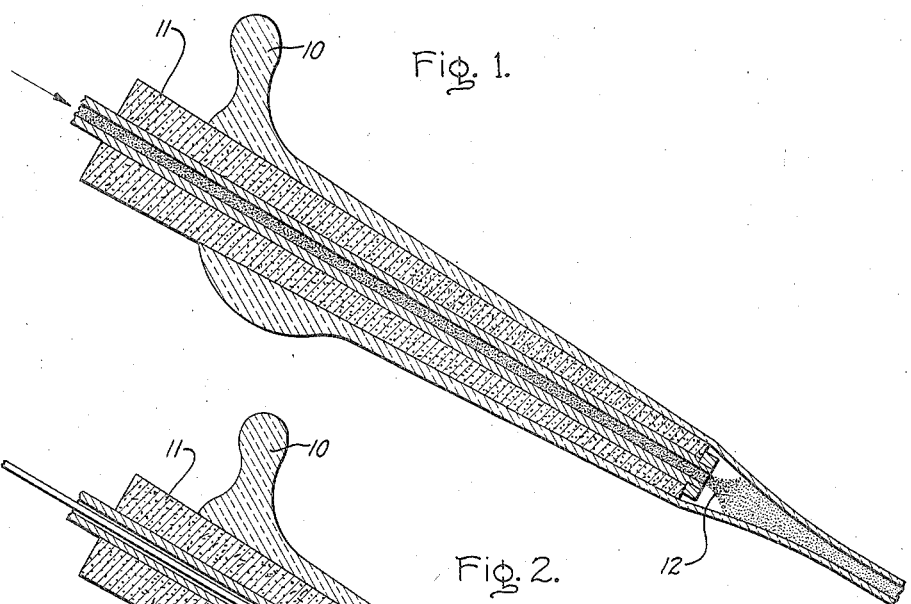
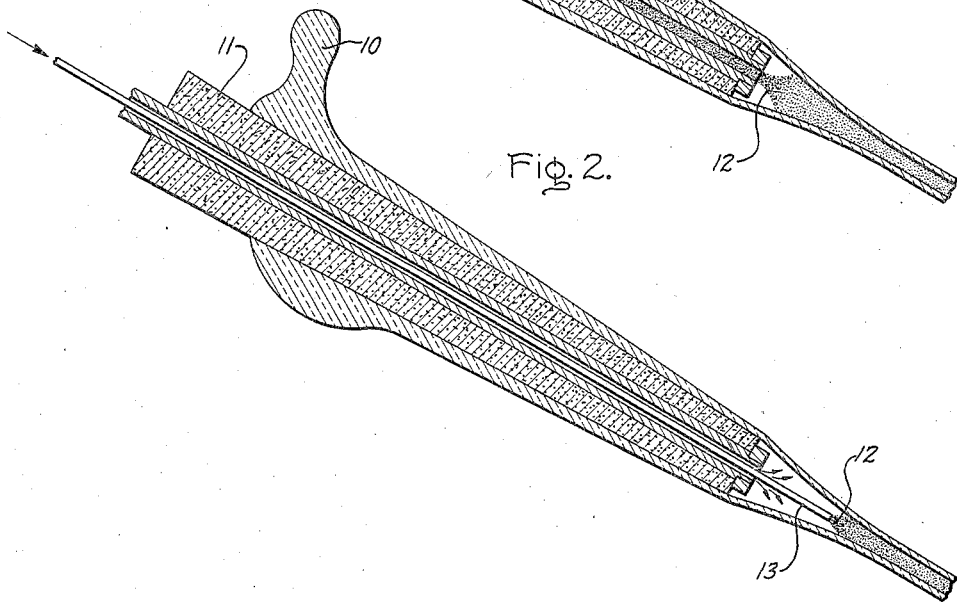
Inventor;
Leonard J. Davies,
by John H. Anderson
His Attorney.

Patented Apr. 8, 1941

2,237,754

UNITED STATES PATENT OFFICE 2,237,754

ELECTRIC LAMP

Leonard John Davies, Rugby, England, assignor to General Electric Company, a corporation of New York Application October 18, 1939, Serial No. 300,071
In Great Britain October 3, 1938

3 Claims. (Cl. 49—79)

This invention relates to electric lamps and more particularly to electric discharge lamps of the type in which a proportion of the energy supplied is given out as non-visible rays some of which are ultra-violet rays. It is well known that such rays can be converted into luminous rays and therefore made to increase the efficiency of the lamp for illuminating purposes, by causing the ultra-violet rays to be intercepted by a luminescent powder, and in such lamps it is necessary to secure a layer of the luminescent material to the glass wall which encloses the arc or the arc tube.

It is known that this may be done by the use of binders and vehicles such as sodium silicate or nitro-cellulose. If these are used the powder may be either mixed with the binder before application or deposited on to the surface of a binder which has previously been applied to the glass while it is still tacky. With any of these methods of application a normal part of the process is to heat the glass surface after the powder has been deposited in order to eliminate undesirable constituents from the binder, and also to cause the powder to adhere in a satisfactory manner to the glass wall. With many examples of luminescent powders very satisfactory adherence can be obtained by raising the glass almost to the softening point, so that the powder adheres either by some chemical union with the glass or by a physical contact such that the powder particles actually become embedded in the glass.

One object of my invention is to provide an economical method of applying the powder which obviates a second heating of the glass and the use of a temporary binder.

Further objects and advantages of my invention will appear from the following description of species thereof and from the accompanying drawing in which:

Fig. 1 is a fragmentary sectional view of apparatus employed in practicing the method comprising my invention; and Fig. 2 is a similar view of a modified form of apparatus used in practicing the method comprising my invention.

The invention consists in depositing the luminescent powders on the glass as it is being formed into tubing from the melt of glass. In particular we form the tubing in a modified form of the well known Danner glass tube-making machine. In machines of this type molten glass 10 is allowed to wrap itself around a downwardly inclined revolving hollow mandrel 11 through which air can be blown in the direction indicated by the arrow, and the glass leaves the mandrel while still in the molten state in the form of tubing. According to the present invention, luminescent powder 12 of a suitable grain size is blown in with the air stream through the hollow mandrel. The powder particles, on coming into contact with the molten or semi-molten surface of the glass, adhere thereto.

Owing to the fact that the tubing is for some distance after leaving the mandrel still elongating, it may be necessary to project into the tubing through the hollow mandrel a secondary tube 13, as shown in Fig. 2, through which the luminescent powder 12 is blown. This secondary tube would project to such a point that any alteration in diameter of the tubing or elongation of it after that point would not result in unwanted reduction or increase of the number of powder particles per unit area.

Tubing thus internally coated would be cut to the desired length in the normal way, and because of the method of manufacture, the complete length of tubing would be coated with powder which is contrary to the present normal practice. Owing to the necessity of sealing in to the ends of the tubing stems or electrode carriers, it is usual to leave the ends of the tubing free of luminescent powder. This is done because such powder might interfere with the seal that has to be made.

If such interference is found, the ends of the tube lengths, after cutting, may be raised to such a temperature that the glass for a suitable distance from the ends becomes molten. In this manner, any powder particles on the inner surface of the molten glass are removed either by chemical decomposition or by complete absorption into the glass. It is understood, of course, that during this process the ends of the tube are not allowed to distort in such a way that electrodes could not be introduced.

In preparing lamp lengths in the above manner the electrode sealing-in machine, and the lamp exhaust oven, may be arranged adjacent to the cutting off point of the tube drawing machine, so that the glass is not allowed to cool before it is on the exhaust pumps. In this way some part at least of the normal oven heating and moreover the possibility of contamination of the powder by dust and atmospheric influences, is avoided.

What I claim as new and desire to secure by Letters Patent of the United States is:

1. The method of applying a coating of luminescent powder to the inner wall of a glass tube which consists in blowing the powder into the tube while it is being drawn and is still in a molten condition.

2. The method of applying a coating of luminescent powder to the inner wall of a glass tube which consists in blowing into the tube the luminescent material entrained in a gaseous medium while the said tube is being drawn and is still in a molten condition.

3. The method of applying a coating of luminescent powder to the inner wall of a glass tube which consists in blowing the powder into the tube while it is being drawn, at a point where the glass tube is still in a molten condition but has undergone substantially the greatest portion of its elongation.

LEONARD JOHN DAVIES.